(12) United States Patent
Sanfilippo et al.

(10) Patent No.: US 7,909,052 B2
(45) Date of Patent: Mar. 22, 2011

(54) APPARATUS AND METHOD FOR CONTROLLING GAS FLOW

(75) Inventors: John E. Sanfilippo, Barrington Hills, IL (US); James J. Sanfilippo, Barrington Hills, IL (US)

(73) Assignee: Packaging Technologies, Inc., Davenport, IA (US)

( * ) Notice: Subject to any disclaimer, the term of this patent is extended or adjusted under 35 U.S.C. 154(b) by 380 days.

(21) Appl. No.: 11/959,383

(22) Filed: Dec. 18, 2007

(65) Prior Publication Data

US 2008/0149184 A1 Jun. 26, 2008

Related U.S. Application Data

(60) Provisional application No. 60/871,387, filed on Dec. 21, 2006.

(51) Int. Cl.
*F17D 1/02* (2006.01)
*F16K 31/00* (2006.01)

(52) U.S. Cl. .................... 137/14; 137/505; 137/487.5

(58) Field of Classification Search ............. 137/487.5, 137/597, 352.34, 602, 605, 606, 883, 505, 137/625.12, 14
See application file for complete search history.

(56) References Cited

U.S. PATENT DOCUMENTS

| 4,030,523 | A | * | 6/1977 | Cram et al. ............. 137/599.07 |
| 4,643,215 | A | * | 2/1987 | Phlipot et al. ............. 137/15.01 |
| 5,313,871 | A | * | 5/1994 | Kaneko et al. ................. 91/361 |
| 5,329,965 | A | * | 7/1994 | Gordon .................... 137/599.07 |
| 5,504,950 | A | * | 4/1996 | Natalizia et al. ................. 4/623 |
| 5,875,817 | A | * | 3/1999 | Carter ..................... 137/599.06 |
| 5,918,616 | A | * | 7/1999 | Sanfilippo et al. ................ 137/1 |
| 2004/0084087 | A1 | * | 5/2004 | Sanfilippo et al. ......... 137/487.5 |
| 2004/0112435 | A1 | * | 6/2004 | Olander .................... 137/487.5 |

* cited by examiner

*Primary Examiner* — Kevin L Lee

(74) *Attorney, Agent, or Firm* — Wood, Herron & Evans, LLP

(57) ABSTRACT

A gassing system includes a gassing device, a pressure regulator in communication with the gassing device and a gas source and a PLC electrically connected to the pressure regulator. In addition, the system includes a removable orifice in communication with the pressure regulator, wherein the pressure regulator controls gas flow responsive to a signal sent from the PLC and wherein gas exiting the pressure regulator flows directly into and through the orifice and directly into the gassing device.

19 Claims, 6 Drawing Sheets

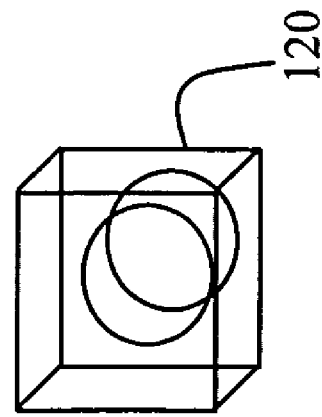
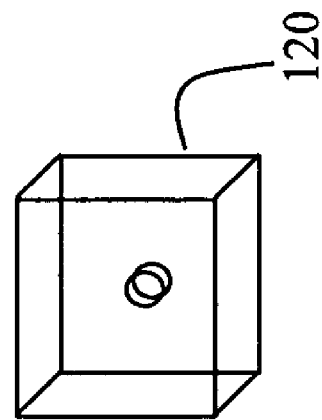
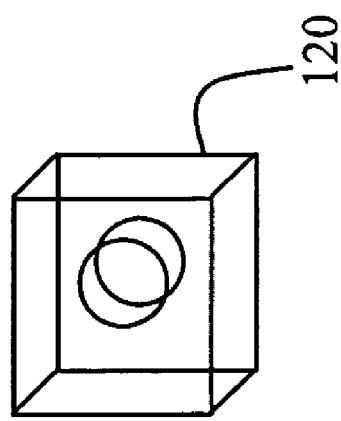
FIG. 2
200

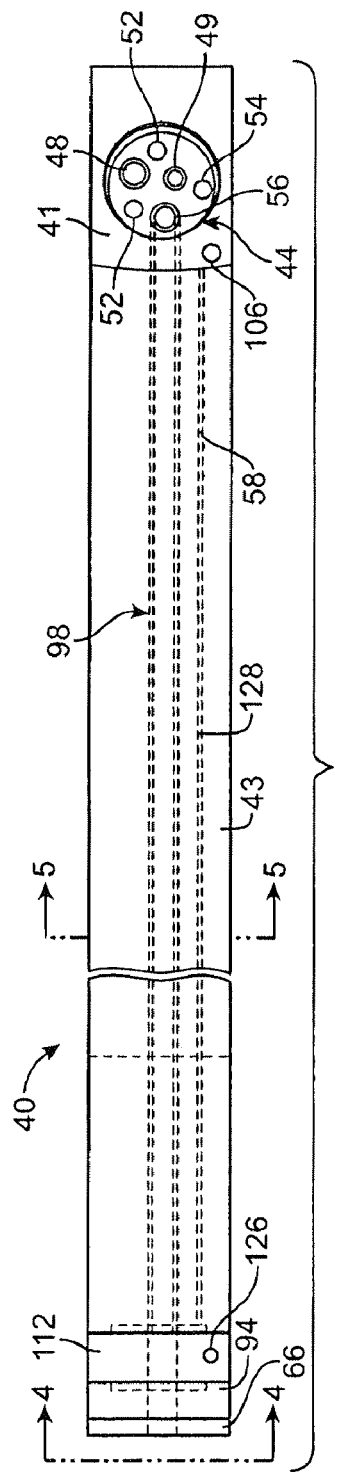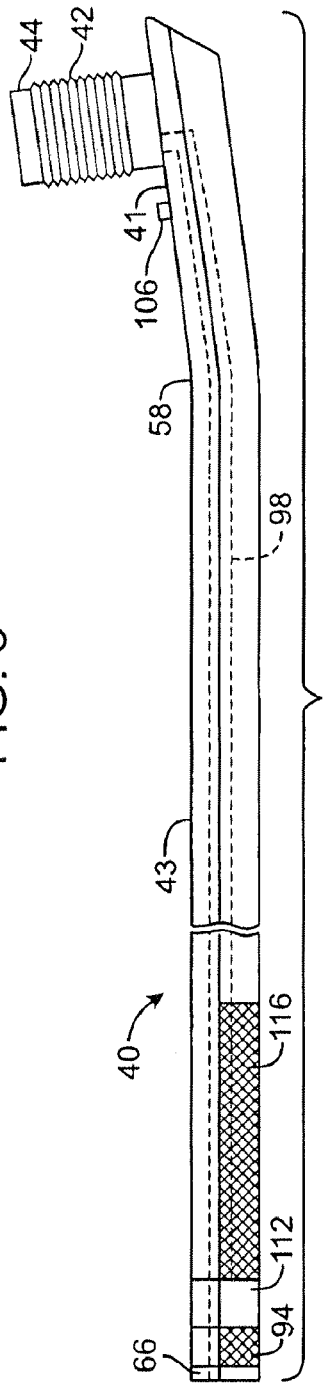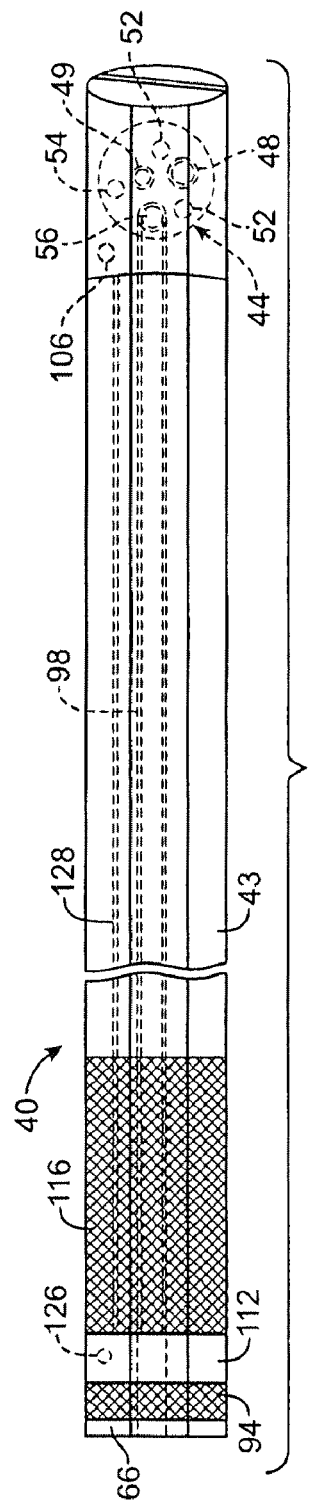

600

700

800

700

APPARATUS AND METHOD FOR CONTROLLING GAS FLOW

RELATED APPLICATIONS

This application claims the benefit of and priority to U.S. Provisional Patents 60/871,387 filed Dec. 21, 2006, and incorporates that application by reference.

FIELD OF THE INVENTION

The invention relates to apparatus for exposing product to a controlled environment, and more particularly to an apparatus and method for controlling gas flow.

BACKGROUND OF THE INVENTION

Various products, including food products, semiconductor products, medical products, and any other products having an adverse reaction to air, are packaged in a controlled environment. Various attempts have been made to efficiently package these products using vacuum and/or controlled environments.

Various food products, including bakery goods, meats, fruits, and vegetables, are packaged under atmospheric conditions. Many of these products are presented in supermarkets, for example, in bags, cartons, or cardboard containers with a plastic or cellophane wrap covering the product.

One problem with this type of packaging is that the goods have a minimum limited shelf life, which for many products is only several days to a week. With bakery goods for example, mold may begin to grow after a few days under atmospheric conditions. Such products obviously cannot be sold or consumed and must be discarded. Another problem arises with respect to many fruits and vegetables, which continue to ripen and continue their metabolic process under atmospheric conditions. For example, within a few days a banana can become overripe and undesirable to the consumer.

To overcome these problems, often the atmospheric air in packaged goods is at least partially replaced with an inert gas. The gas is typically flowed into a package at about the time the package is sealed so that the atmospheric air is evacuated and forced out by the inert gas.

Controlling the inert gas flow is a challenge. It is desirable to ensure appropriate gas fill within the package, without undesirable waste of inert gas. Overflow can result in product spillage, as well as waste of gas. Underflow can promote premature product spoilage by allowing atmospheric gases to remain in the product packaging. In addition, it is desirable to obtain pricing advantages on the components of the system, as well as to reduce space demands and human intervention.

It would be desirable to have a gassing system that overcomes the above disadvantages.

SUMMARY OF THE INVENTION

The present invention provides a gassing system including a gassing device, a pressure regulator in communication with the gassing device and a gas source and a programmable logic controller electrically connected to the pressure regulator. In addition, the invention includes a removable orifice in communication with the pressure regulator, wherein the pressure regulator controls gas flow responsive to a signal sent from the programmable logic controller and wherein gas exiting the pressure regulator flows directly into and through the orifice and directly into the gassing device.

Another aspect of the invention provides a method of operating a gassing system. The method includes sending a control signal, controlling gas pressure based on the control signal, and flowing gas under the controlled pressure directly into and through a removable orifice. In addition, the method includes flowing gas from the removable orifice directly into a gassing device.

Another aspect of the invention provides a system for operating a gassing system. The system includes means for sending a control signal, means for controlling gas pressure based on the control signal, and means for flowing gas under the controlled pressure directly into and through a removable orifice. In addition, the system includes means for flowing gas from the removable orifice directly into a gassing device.

The foregoing and other features and advantages of the invention will become further apparent from the following detailed description of the presently preferred embodiment, read in conjunction with the accompanying drawings. The drawings are not to scale. The detailed description and drawings are merely illustrative of the invention rather than limiting, the scope of the invention being defined by the appended claims and equivalents thereof.

BRIEF DESCRIPTION OF THE DRAWINGS

FIG. 2 illustrates a plurality of removable orifices made in accordance with the present invention;

FIGS. 3, 4, & 5 are views of gassing devices made in accordance with one aspect of the present invention;

DETAILED DESCRIPTION OF PRESENTLY PREFERRED EMBODIMENTS

Figure 1:
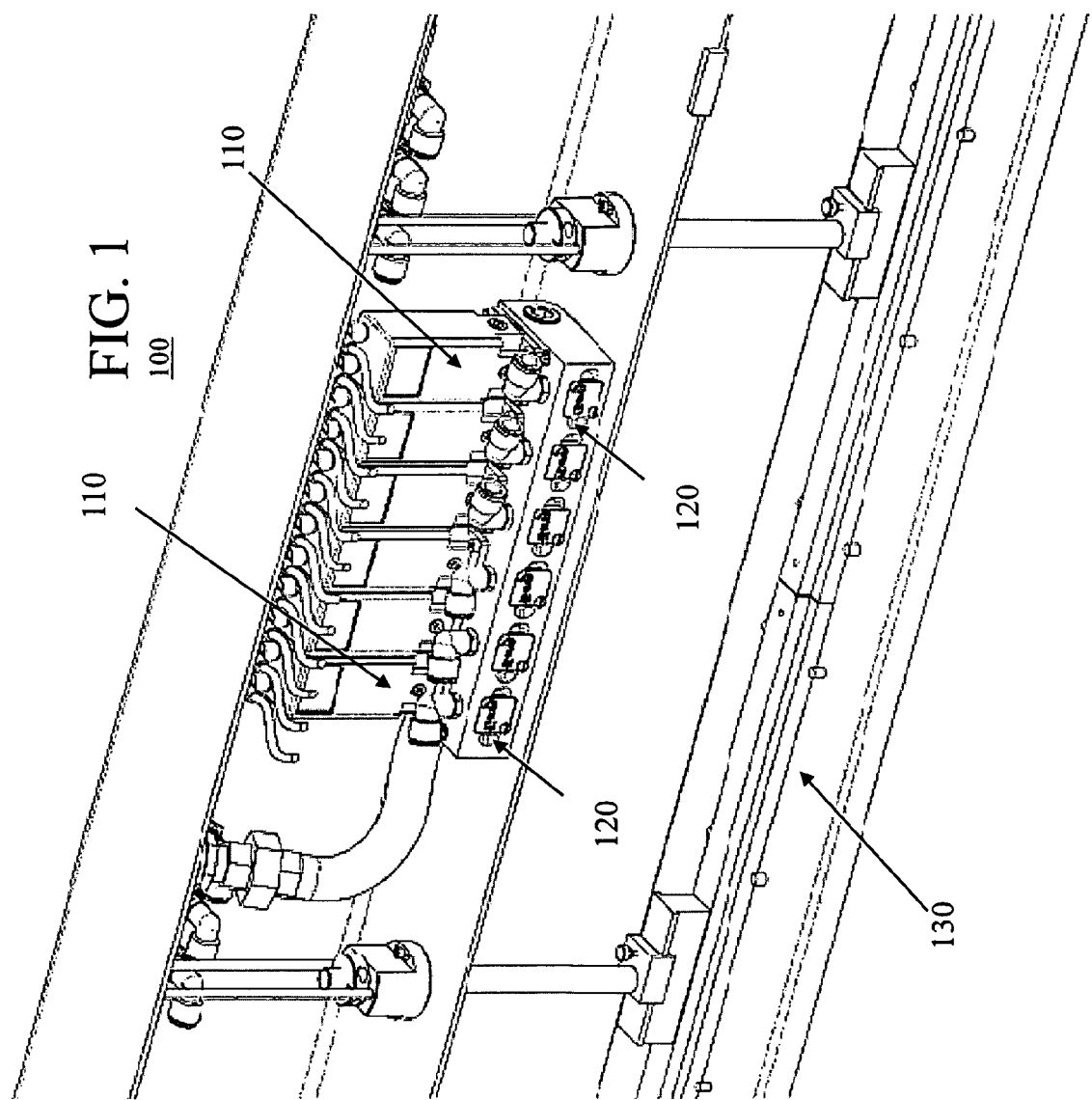
FIG. 1 is an illustrative portion of a gassing control system made in accordance with the present invention.

FIG. 1 illustrates an embodiment of a portion of a gassing control system 100 in accordance with one aspect of the invention. Pressure regulator 110 is in communication with removable orifice 120. The pressure regulator is any device configured to regulate pressure of fluids or gasses routed through the pressure regulator. An exemplary pressure regulator 110 is available from SMC, Inc. and has a DeviceNet interface. Pressure regulator 110 communicates with the removable orifice 120 via a manifold. The gas flow between the pressure regulator and removable orifice is affected by the pressure regulator settings and at least one characteristic of the removable orifice. For example, the pressure regulator can be configured to control pressure in the range of 0-70 psi. The gas flow can be regulated, for example, between 200 and 600 and 1000 Standard Cubic Foot/Hour ("SCFH"). Various control strategies, including but not limited to Proportional Integral Derivative (PID) control, speed, logarithmic, linear, maximum, minimum, a combination of at least one of these strategies, or the like can be used to control the gas flow.

The removable orifice 120 includes at least one dimension, such as diameter, radius, and length. In one embodiment, a plurality of removable orifices 120 is included in the system, and each of the plurality may include different dimensions than the other removable orifices. Thus, for example, the diameter of the removable orifice 120 can vary among different removable orifices. For example, a first removable orifice includes a 0.056 inch diameter, a second removable orifice includes a 0.093 inch diameter, and a third removable orifice includes a 0.128 inch diameter. In one embodiment, a plurality of characteristics including dimension are recorded in an orifice air flow chart or look up table. The air flow chart or look up table associates removable orifice characteristics with a particular SCFH measurement (or other measurement, such as pressure), for example. One example of an air flow chart is available from O'Keefe Controls Company.

For example, FIG. 2 illustrates three removable orifices in accordance with one aspect of the invention, each with differing radii and diameters at 200. In one embodiment, the removable orifices 120 are connected together in one piece configured for sliding engagement in the gas line so that a single piece containing a plurality of orifices is slid into position so that the desired orifice is in the gas line. In one embodiment, the single piece is controlled by signals responsive to a flow curve and desired flow rate determined by and issued from the PLC.

In an alternate embodiment, the removable orifice may be removably fixed to operate at a given position and can be changed as desired to allow for different flow rates.

Gas exiting the pressure regulator 110 flows directly into and through the removable orifice 120. The gas then flows directly into the gassing device 130. As used herein, the term "directly" means that no devices configured to significantly affect the gas flow impinge on the gas flow so that solely a manifold, appropriate fittings, and any baffle and/or filtering device connect the devices. Thus, the pressure regulator is connected to the removable orifice solely by a manifold and appropriate fittings and/or baffles and/or filtering devices and the removable orifice is connected to the gassing device solely by a length of tubing and any necessary fittings. In one embodiment, the gassing device comprises a gassing chamber in communication with the pressure regulator through the removable orifice, and wherein the gassing chamber is further in communication with a screen.

The pressure regulator 110 is electrically connected to a programmable logic controller ("PLC") (not shown). The PLC is any device configured to control a pressure regulator to obtain a desired gas flow rate. Exemplary PLC units are available from, for example, Festo Corp and Allen Bradley. In one embodiment, the logic employed by the PLC is responsive to a flow curve established responsive to dimensions of the removable orifice. In such an embodiment, the PLC calculates the pressure needed to establish a desired flow rate based on an input of the removable orifice and controls the pressure regulator 110 based on the pressure needed.

The gas flows through the removable orifice and enters the gassing device 130, prior to passing through a screen. The gas flow from the gassing chamber can be a simple gas flow, a slitted flow, slotted flow, accelerator flow, coanda flow, a laminar flow, a dual laminar flow, or other purposed flow. The flow can also be affected by the screen. For example, one portion of the screen can include 3 plies, while another portion of the screen includes 5 plies, such that gas flows through the 3-ply area faster than through the 5-ply area.

One example of a gassing device is illustrated as gassing lance 40 in FIGS. 3, 4, and 5. Gassing lance 40 includes a gassing lance base 41 (hereinafter "base") and a gassing lance extension 43 (hereinafter "extension"). Base 41 may be removably connectable with extension 43. A seal may be provided on base 41 and/or in extension 43 for sealing the interconnection between the two members. Additionally, the interconnection area between base 41 and extension 43 may be bent at section 58 for facilitating alignment of gassing lance 40 with a forming tube. An indented section may be provided in base 41 for facilitating alignment of a docking port 44. A docking port 44 for connection of a connector, such as connector 49, may be provided on base 41. Docking port 44 may include a connector 49, such as a screw or the like, for retention thereof onto base 41 of gassing lance 40. Docking port 44 may further include a laminar gas port 48, holes 52 for insertion of locating pins provided in connect 46, analyzer gas port 54 and accelerator gas port 56. Laminar gas port 48, analyzer gas port 54 and accelerator gas port 56 may each include an o-ring for sealing the connection with laminar, analyzer and accelerator gas ports of connector 46. In order to obtain a reliable gas reading, analyzer gas port 54 must be sealed off completely from interference from other gas ports as well as the ambient environment. As discussed in greater detail below, analyzer gas port 54 allows verification that the gas is at the desired level prior to sealing a package. The outer surface of docking port 44 may include threads 42 for permitting a locking nut to be threadedly engaged thereto. It is foreseeable that other means of providing a connect feature for attachment of gas to docking port 44 may also be used. A spacer, including a hole for permitting insertion of docking port 44 therethrough, may be used to fasten gassing lance 40 securely to forming tube. An endcap 66 may be provided at an end of extension 43 (i.e. left side of FIG. 3). Endcap 66 may include projections including threaded holes for insertion of fasteners, such as screws, for securing endcap 66 to gassing lance 40. A cutout may be provided in endcap 66 for permitting exit of accelerator gas flow therethrough. Other embodiments of gassing devices or gassing rails can also be used. In one embodiment, the gassing rail disclosed in U.S. patent application (4700/83) is used as the gassing device. Any other gassing rail, gas delivery device, or gassing lance can be used in association with the disclosures of this invention.

Figure 6:
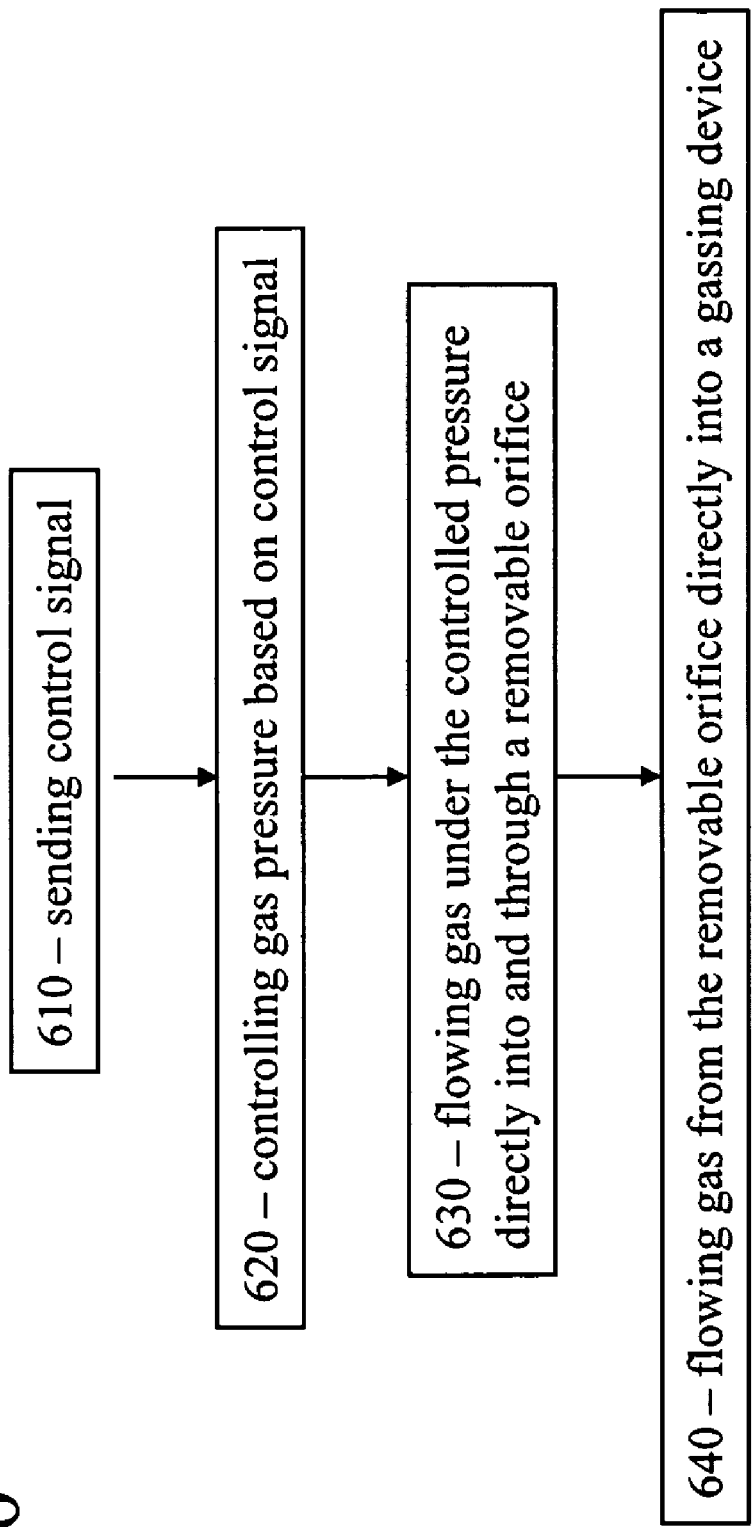
FIG. 6 is a flowchart illustrative of a method for controlling a gassing system in accordance with another embodiment of the present invention.

FIG. 6 illustrates an exemplary flowchart of a method 600 for operating a gassing system in accordance with another aspect of the invention. Method 600 begins by controlling gas pressure based on a control signal (block 610). For example, the control signal is sent by a PLC and received at a pressure regulator. The pressure regulator then regulates the pressure of the gas based on the control signal (block 620), and the gas flows under the controlled pressure directly into and through a removable orifice (block 630). After passing through the removable orifice, the gas flows substantially directly into a gassing device (block 640).

Figure 7:
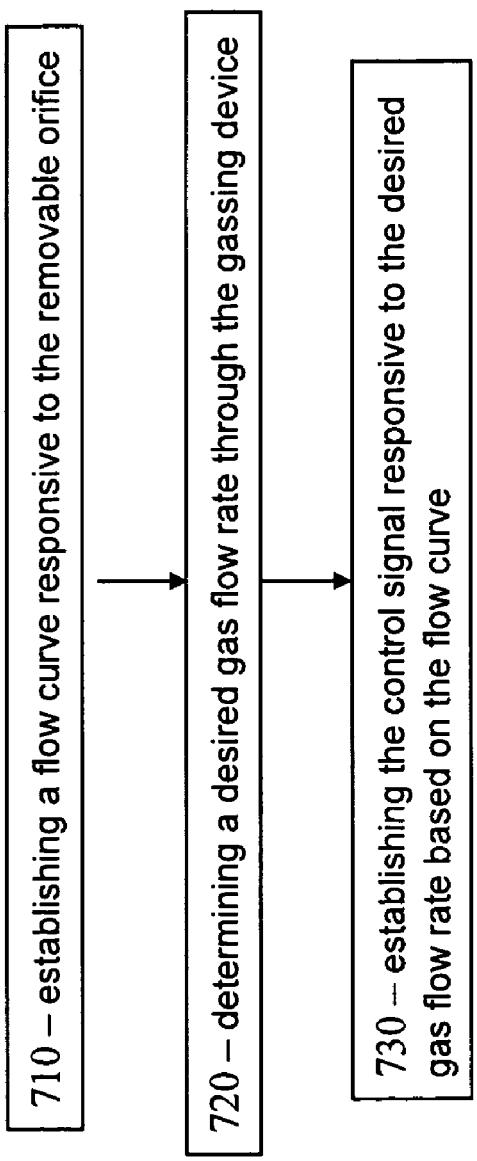
FIG. 7 is a flowchart illustrative of a method for controlling a gassing system in accordance with another embodiment of the present invention.

FIG. 7 illustrates an exemplary flowchart of a method 700 for operating a gassing system in accordance with another aspect of the invention. Method 700 begins by establishing a flow curve responsive to the removable orifice (block 710). The flow curve is established, either empirically via experimentation or mathematically via estimation and/or algorithmic evaluations. Experimentation can include measuring flow rates through a fixed removable orifice at a variety of gas pressures and then altering at least one measurement (such as radius) of the removable orifice. The flow curve can also be established using a combination of empirical and mathematical methods. In addition, data can be interpolated between other data. Furthermore, the flow curve can be implemented as a chart, look up table, graph, mathematical expression or equation, or other such data recordation technique.

A desired gas flow rate through the gassing device is determined (block 720). The desired gas flow rate can be responsive to a distance between the gassing device, volume of gas to be delivered, time allotted in which to deliver the volume of gas, whether the gas flow is laminar, non-laminar, or dual laminar, or another consideration. The desired gas flow rate is determined with appropriate means, including experimentation, estimation, mathematical expressions, determination of assembly line speed and packaging space to be gassed, or the like.

The control signal is established based on the desired gas flow rate, flow curve and removable orifice dimensions (block 730). For example, the PLC can determine the dimensions of the removable orifice, such as via a user interface, or via estimation based on pressure data and a gas flow meter, and the desired gas flow rate. Based on these data points, the PLC can consult the flow curve to determine the appropriate gas pressure and establish the control signal responsive to the appropriate gas pressure.

Figure 8:
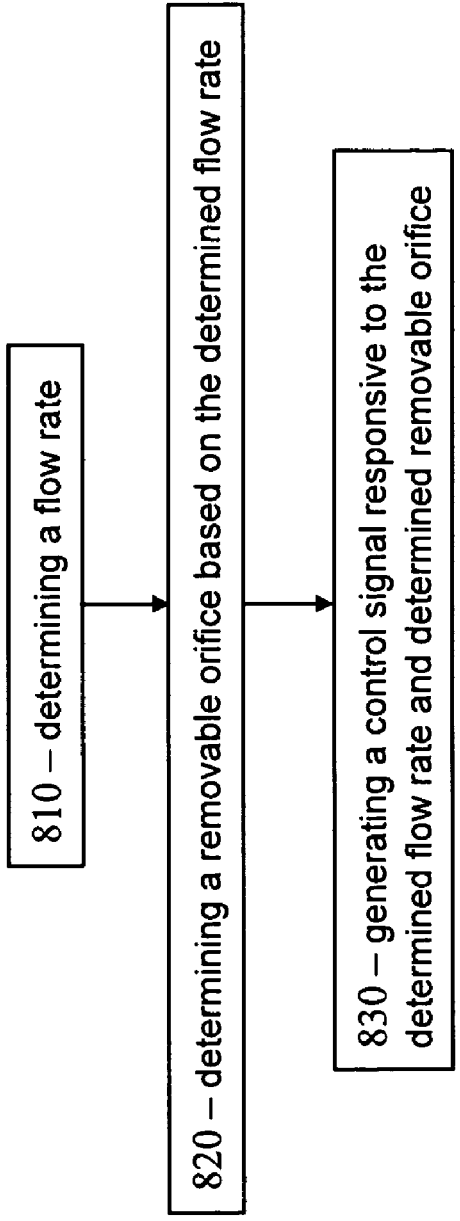
FIG. 8 is a flowchart illustrative of a method for controlling a gassing system in accordance with another embodiment of the present invention.

FIG. 8 illustrates an exemplary flowchart of a method 800 for operating a gassing system in accordance with another aspect of the invention. Method 800 begins by determining a flow rate (block 810). The flow rate can be determined via user input, by input from a flow meter, or by other means. Based on the determined flow rate, a removable orifice is determined (block 820), and placed in the gas flow path between the pressure regulator and gassing device. The control signal is then generated by the PLC responsive to the determined flow rate and determined removable orifice (block 830).

The devices disclosed herein can be physically located in an appropriate position. In one embodiment, the gassing device is placed in proximity to the packaging to be gassed. In another embodiment, the devices are placed within a c-channel, enabling access to the removable orifice and/or pressure regulator. In another embodiment, the devices are placed in panels situated for operator control. Use of the disclosures herein allow elimination of dedicated control panels and for a distributed gassing flow control system, wherein the devices are maintained within a c-channel supporting the gassing device. In one embodiment, all wiring is maintained within the c-channel, and in certain embodiments, the wiring is daisy-chained in series. Thus, the length of the manifold connecting the devices can be reduced, and the devices occupy a smaller footprint.

Figure 9:
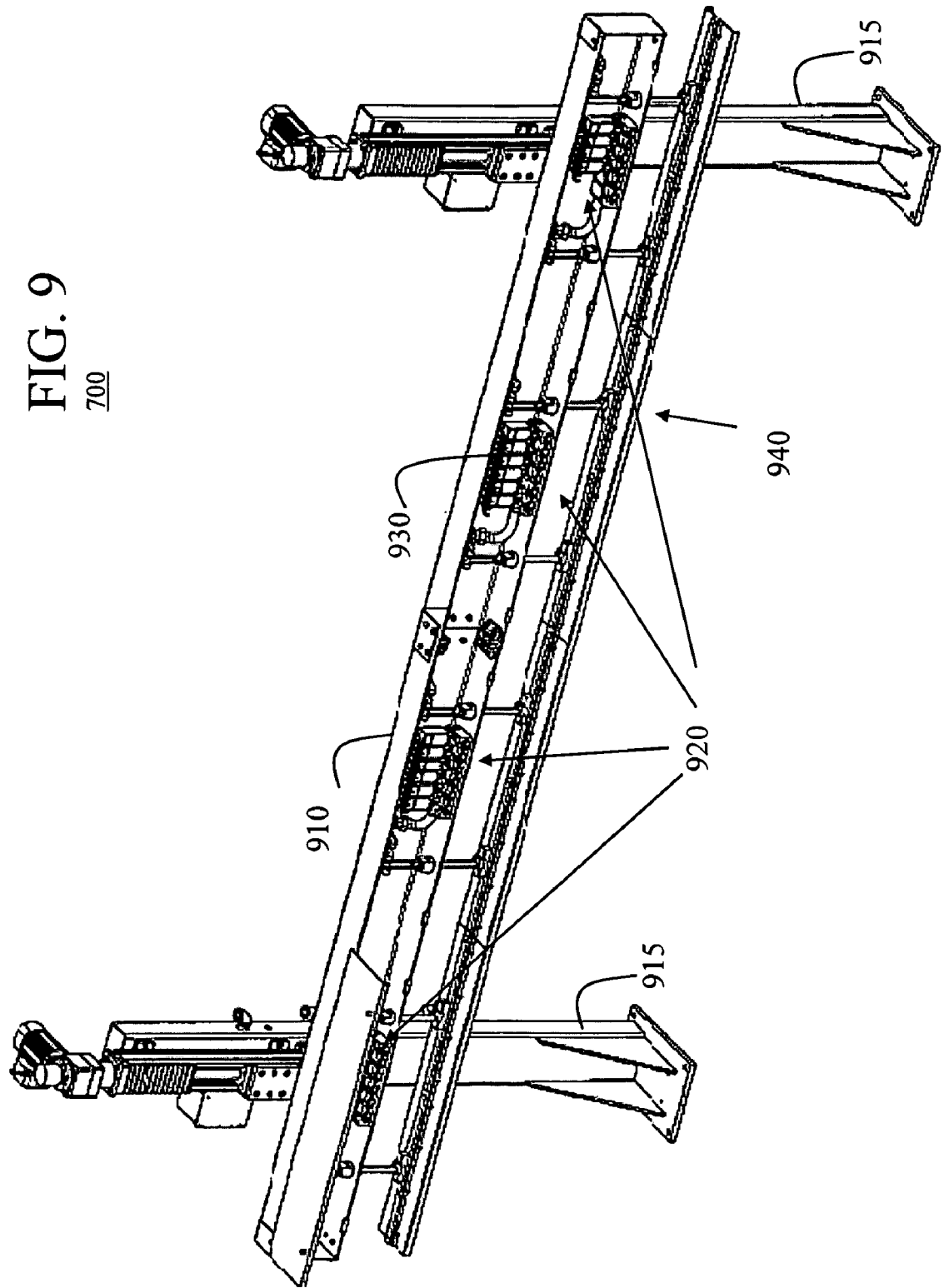
FIG. 9 is a perspective view of a gassing control system made in accordance with the present invention.

For example, FIG. 9 illustrates a c-channel 910 supported by two jacks 915. FIG. 9 illustrates 4 banks of gassing control systems 920. Each bank of gassing control systems includes at least one pressure regulator 930 in communication with a gassing device 940. A shut-off can be attached to each jack, only one jack, the pressure regulators individually or collectively, or another location. Each jack 915 is configured to raise or lower the devices with respect to the floor. In addition, in the embodiment illustrated in FIG. 9, the gassing device 940 is configured to be raised or lowered with respect to the c-channel. In other embodiments, not illustrated in FIG. 9, the gassing device 940 is fixed in position relative to the c-channel.

It will be readily apparent that the methods and apparatuses discussed herein, and their obvious modifications, can result in a method of operating a gassing system that increases the adjustability of gas flow, granting an operator improved control over gassing utilization. These methods result in an integrated control system, eliminating the need for a control panel.

While the embodiments of the invention disclosed herein are presently considered to be preferred, various changes and modifications can be made without departing from the scope of the invention. The scope of the invention is indicated in the appended claims, and all changes that come within the meaning and range of equivalents are intended to be embraced therein.

We claim:
1. A gassing system comprising:
a gassing device;
a pressure regulator in communication with the gassing device and a gas source;
a programmable logic controller electrically connected to the pressure regulator; and
a removable constant flow orifice member having a fixed gas passage therethrough in direct communication with, and connected directly to, the pressure regulator,
wherein the pressure regulator controls gas flow responsive to a signal sent from the programmable logic controller and wherein gas exiting the pressure regulator flows directly into and through the orifice and then substantially directly into the gassing device.

2. The gassing system of claim 1 wherein the removable orifice is selected from a plurality of precision orifices wherein a measurement of each of the precision orifices differs from the other precision orifices.

3. The gassing system of claim 2 wherein the removable orifice is selected form the plurality of precision orifices to control a gas flow rate of the gassing device.

4. The gassing system of claim 2 wherein the measurement is selected from the group consisting of shape, circumference, radius, diameter, and length.

5. The gassing system of claim 1 wherein the pressure regulator is in communication with the removable orifice via a manifold, and wherein gas flow between the pressure regulator and removable orifice is affected by the pressure regulator and a measurement of the removable orifice.

6. The gassing system of claim 1 wherein the gassing device comprises a gassing chamber in communication with the pressure regulator through the removable orifice, and wherein the gassing chamber is further in communication with a screen.

7. The gassing system of claim 6 wherein the gas flow through the gassing chamber is one of an accelerator flow, a coanda flow, a slotted flow, a slitted flow, and a dual laminar flow.

8. The gassing system of claim 1 further comprising
a c-channel supporting at least one of the pressure regulator,
removable orifice, gassing device, and programmable logic controller.

9. A method of operating a gassing system, the method comprising:
sending a control signal;
controlling gas pressure based on the control signal;
flowing gas under the controlled pressure directly into and through a removable orifice member having a fixed gas passage therethrough;
flowing gas from the removable orifice directly into a gassing device.

10. The method of claim 9 wherein the removable orifice is selected from a plurality of precision orifices wherein a measurement of each of the precision orifices differs from the other precision orifices.

11. The method of claim 10 wherein the removable orifice is selected from the plurality of precision orifices to control a gas flow rate of the gassing device.

12. The method of claim 10 wherein the measurement is selected from the group consisting of shape, circumference, radius, diameter, and length.

13. The method of claim 12 wherein the pressure regulator is in communication with the removable orifice via a manifold, and wherein gas flow between the pressure regulator and removable orifice is affected by the pressure regulator and the measurement of the removable orifice.

14. The method of claim 9 wherein the gassing device comprises a gassing chamber in communication with the pressure regulator through the removable orifice, and wherein the gassing chamber is further in communication with a screen.

15. The method of claim 14 wherein the gas flow through the gassing chamber is one of an accelerator flow, a coanda flow, a slotted flow, a slitted flow, and a dual laminar flow.

16. The method of claim 9 further comprising:
establishing a flow curve responsive to the removable orifice;
determining a desired gas flow rate through the gassing device; and
establishing the control signal responsive to the desired gas flow rate based on the flow curve.

17. The method of claim 9 further comprising:
determining a flow rate;
determining a removable orifice based on the determined flow rate, and
generating a control signal responsive to the determined flow rate and determined removable orifice, and wherein sending the control signal is responsive to the generated control signal.

18. A system for of operating a gassing system, the system comprising:
means for sending a control signal;
means for controlling gas pressure based on the control signal;
means for flowing gas under the controlled pressure directly into and through a removable orifice means;
means for flowing gas from the removable orifice directly into a gassing device.

19. The system of claim 18 further comprising: means for supporting at least one of the pressure regulator, removable orifice, gassing device, and programmable logic controller.

* * * * *